No. 781,461. PATENTED JAN. 31, 1905.
J. C. RAYMOND.
WHEEL.
APPLICATION FILED OCT. 12, 1904.
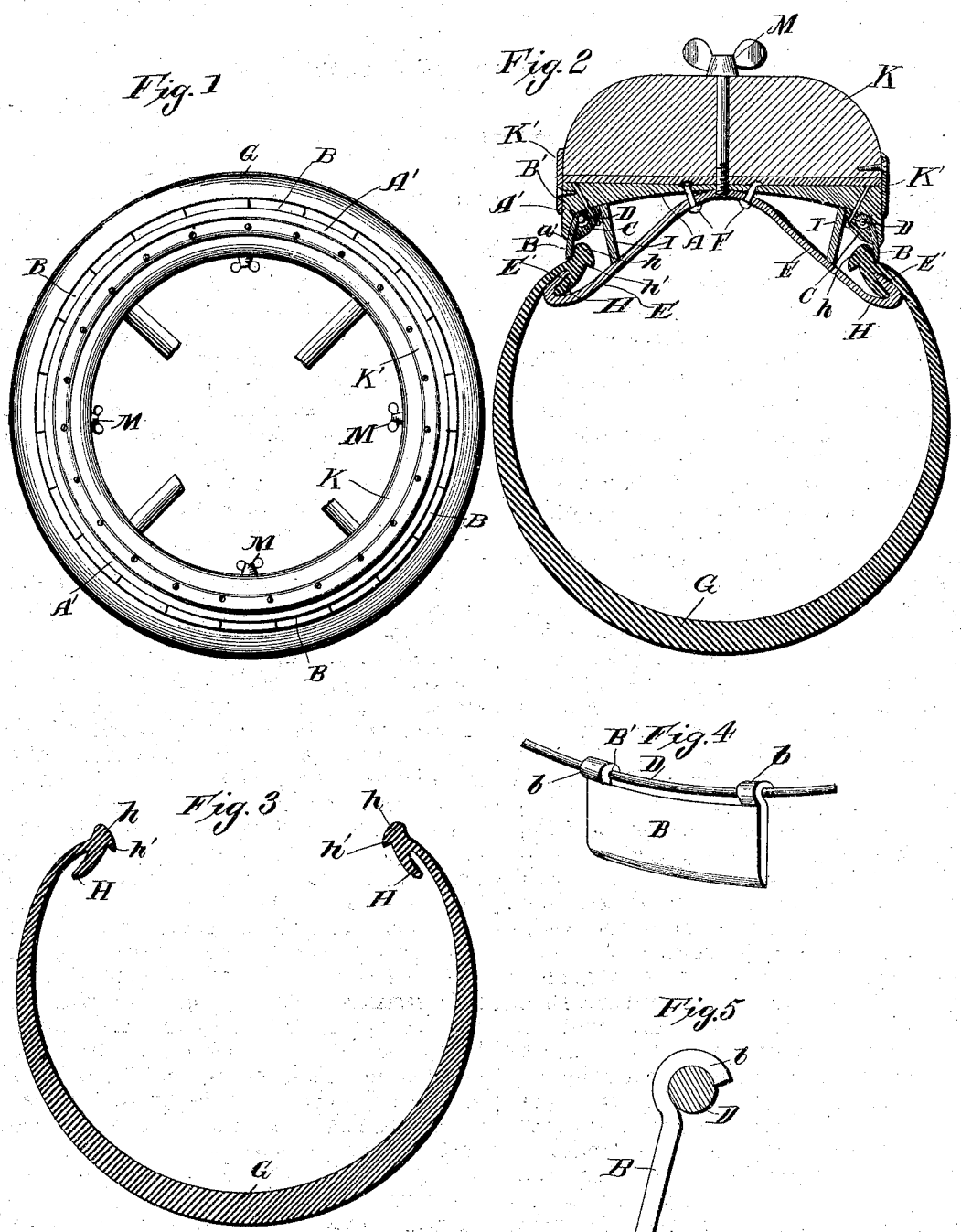
INVENTOR
John C. Raymond No. 781,461.

Patented January 31, 1905.

UNITED STATES PATENT OFFICE.

JOHN C. RAYMOND, OF NEW YORK, N. Y.

WHEEL.

SPECIFICATION forming part of Letters Patent No. 781,461, dated January 31, 1905.

Application filed October 12, 1904. Serial No. 228,211.

*To all whom it may concern:*

Be it known that I, JOHN C. RAYMOND, a citizen of the United States, residing at New York, borough of Manhattan, in the county of New York and State of New York, have made certain new and useful Improvements in Wheels, of which the following is a specification.

My invention is an improvement in wheels, and particularly in the means for securing the tire in place, and has for an object to provide a simple novel construction by which the tire may be securely held and may be readily removed and replaced whenever desired; and the invention consists in certain novel constructions and combinations of parts, as will be hereinafter described and claimed.

In the drawings, Figure 1 is a side view of a wheel rim and tire embodying my invention. Fig. 2 is an enlarged cross-section of same. Fig. 3 is a detail cross-section of the tire. Fig. 4 is a detail perspective view showing the means for securing the pivotal connection of one of the latch-sections; and Fig. 5 is a sectional view showing the means for securing the pivotal connection of one of the latch-sections, all of which will be described.

In carrying out my invention the wheel-rim A is provided at its edges with the inwardly-turned flanges A', whose extremities $a'$ form a stop to limit the outward movement of the latch-sections B, which are pivoted at B' at their inner edges within the flanges A' of the rim A and are pressed normally outward by means of a spring C, so that in normal position the latch-sections B rest outwardly against the edges $a'$ of the flanges A'. As shown, the spring C is a strip of soft rubber secured to the rim A and bearing against the inner side of the latch-sections B to press the same yieldingly outward, as shown. The sections B are made of suitable length to permit their easy operation and extend in a series around the rim, as shown. In pivoting the latch-sections B it is preferred to provide at their inner edges hooks $b$, which engage with the pivot-rod D, the latter being suitably secured at intervals to the rim A, as will be understood from Fig. 2 of the drawings.

The rim A is provided in its inner side with outwardly-extending wings E, which are preferably the opposite edges of a plate secured at its middle at F to the rim, the outer edges of the wings E being re-turned, forming hooks E', which face or open inwardly and are arranged adjacent to the outer edges of the swinging latch-sections B, as best shown in Fig. 2 of the drawings. These hooks E' face inwardly, and the latch-sections B opposite the points of the hooks E' control the opening or entrance to the space between the outer hooked edges of the wings E and the edges $a'$ of the flanges A'.

The tire G is in the form of a strip provided at its edges on its inner side with hooks H to engage with the hooks E' of the wings E and with projecting heel portions $h$ for abutment by the latch-sections B when the parts are adjusted for use, as shown in Fig. 2, and on the inner sides of the hook portions H are provided shoulders or ribs $h'$ for engagement by any suitable hooked tool for use in removing the tire when desired.

The wings E may be braced from the rim-plate A by means of plates I, extending between said parts A and E, as best shown in Fig. 2 of the drawings.

In operation in applying the tire G to the rim, the tire being deflated, its hook portions may be inserted into the space between the latch-sections B and the wings E, the latch-sections being pushed back as the hook portions H are inserted, and after said hooks have been inserted into engagement with the hooks E' the latch-sections B may be pressed outward to bear against the outer sides of the heel portion H of the hooks E in such manner as to lock the tire securely in place when the tire is inflated in use, the spring C tending to normally press the latch-sections outward and yet permit the same to be pressed in when desired. This spring C may be of any suitable material; but I find in practice it is desirable to make the same of soft rubber, as before described. When the tire is inflated, the parts arranged as shown in Fig. 2 operate to prevent any displacement of the tire and yet permit the same to be quickly removed and repaired and replaced or another substituted for it, thus avoiding unnecessary delays in the use of the invention.

As shown, the body K of the wheel has its felly fitted within the rim A and secured thereto by thumb-screws M, so the tire or rim portion can be readily removed from the body of the wheel and replaced when desired. At one side of the tire of the body of the wheel I provide a flange K' to act as a stop in applying the felly to the body of the wheel. Where desired, a flange may be secured at the opposite side from the flange K' to make both sides uniform in appearance.

Having thus described my invention, what I claim as new, and desire to secure by Letters Patent, is—

1. The combination with the rim provided at its edges with the inturned flanges and having the opposite wings provided at their outer edges with re-turned hooks facing inwardly, brace-plates between the rim and the said wings, the latch-sections provided at their inner edges with hooks to engage with the pivot-rods, the pivot-rods secured to the rims and engaged by the hooks of the latch-sections, the springs secured to the rim and bearing against the inner sides of the latch-sections to force the same outwardly, and the tire provided at its edges with hooks to engage with the re-turned hooks of the wings and having the projecting heel portions for engagement by the latch-sections, and the longitudinal ribs for engagement by a removing-tool.

2. The combination of the rim-plate provided with the wings having at their outer edges the re-turned hooks, the latch-sections pivoted to the rim and the tire provided at its edges with hooks to engage with those of the wings and with portions to engage with the latch-sections.

3. The combination with the rim having the wings provided with the re-turned hooks, of the tire provided at its edges on its inner side with hooks to engage with the said wing-hooks, the latter operating within the tire, and latch devices supported by the rim for securing the tire-hooks in engagement with those of the wings.

4. The combination of the rim-plate having the inturned flanges at its edges, the latch-sections pivoted to the rim-plate and limited in their outward movement by the inturned flange, springs for actuating said latches, the wings provided with inturned hooks and the tire provided at its edges with hooks to engage with those of the wings.

5. A rim provided in its edges with inturned flanges and having wings provided with re-turned hooks, the tire having hooks engaging with those of the wings, and the latch-section and the springs for actuating the same.

6. A tire provided at its edges with re-turned hooks and on the same side as the hooks with ribs or shoulders for engagement by a removing-tool.

7. The combination of a rim having wings provided with re-turned hooks, a tire having on its inner side hooks to engage with those of the wings and projecting heel portions, and latch devices carried by the rim and engaging with said heel portions.

8. The combination of a rim having hook portions, a tire having hooks engaging with those of the rim, and latch devices operating outside of both the interlocking hooks for securing the hooks in engagement.

9. A rim having hooks for engagement by the tire, the tire having hooks to engage with those of the rim, latch-sections for securing the hooks in engagement and springs for actuating the latch-sections.

10. The combination of the rim having inturned edge flanges and wings provided with re-turned hooks, the tire having hooks engaging with those of the rim-wings, latch-sections pivoted to the rim and abutting and limited in their outward movement by the flange of said rim, and springs for actuating the latch-sections outwardly.

11. The combination of the rim having inturned edge flanges, and wings provided with re-turned hooks, the tire engaging with said hooks, latch-sections on the rim and engaging with the tire, and the body of the wheel fitted within the rim and detachably secured thereto, substantially as set forth.

JOHN C. RAYMOND.

Witnesses:
   SOLON C. KEMON,
   PERRY B. TURPIN.